United States Patent
Gervais et al.

(10) Patent No.: US 10,620,028 B2
(45) Date of Patent: Apr. 14, 2020

(54) SPLIT METER ROLLER SHAFT

(71) Applicant: CNH Industrial Canada, Ltd., Saskatoon (CA)

(72) Inventors: Joel John Octave Gervais, Saskatoon (CA); Ethan Curtis Stephen Bent, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 108 days.

(21) Appl. No.: 15/908,244

(22) Filed: Feb. 28, 2018

(65) Prior Publication Data

US 2018/0188090 A1 Jul. 5, 2018

Related U.S. Application Data

(62) Division of application No. 14/932,544, filed on Nov. 4, 2015, now Pat. No. 9,939,302.

(60) Provisional application No. 62/075,083, filed on Nov. 4, 2014.

(51) Int. Cl.
| | |
|---|---|
| *G01F 11/00* | (2006.01) |
| *A01C 7/12* | (2006.01) |
| *G01F 11/24* | (2006.01) |
| *A01C 7/08* | (2006.01) |

(52) U.S. Cl.
CPC ............ *G01F 11/003* (2013.01); *A01C 7/127* (2013.01); *G01F 11/24* (2013.01); *A01C 7/081* (2013.01)

(58) Field of Classification Search
CPC ........ G01F 11/003; G01F 11/00; G01F 11/24; G01F 11/20; G01F 11/12; G01F 11/10; A01C 7/127; A01C 7/12; A01C 7/08; A01C 7/00; A01C 7/081
See application file for complete search history.

(56) References Cited

U.S. PATENT DOCUMENTS

| | | |
|---|---|---|
| 2,148,975 A | 2/1939 | Agren |
| 3,362,143 A | 1/1968 | Gullickson |
| 3,608,783 A | 9/1971 | van der Lely |

(Continued)

FOREIGN PATENT DOCUMENTS

| | | |
|---|---|---|
| DE | 3823532 A1 | 1/1990 |
| DE | 3909968 A1 | 9/1990 |

(Continued)

OTHER PUBLICATIONS

1910 Air Commodity Cart; John Deere; 2013; Retrieved at www.deere.com/wps/dcom/en_US/products/equipment/planting_and_seeding_equipment/air_seeding/1910_commodity_air_cart/1910_commodity_air_cart.page.

(Continued)

*Primary Examiner* — Christopher J. Novosad
(74) *Attorney, Agent, or Firm* — Rebecca L. Henkel; Rickard K. DeMille

(57) ABSTRACT

An agricultural metering system includes a driven shaft having a first engagement feature configured to selectively engage a second engagement feature of a drive shaft mounted within a meter box of the agricultural metering system to non-rotatably couple the driven shaft to the drive shaft. The agricultural metering system includes a meter roller non-rotatably coupled to the driven shaft. The meter roller is configured to be selectively disposed within the meter box, and the first engagement feature is configured to engage the second engagement feature while the meter roller is disposed within the meter box to facilitate rotation of the meter roller in response to rotation of the drive shaft.

4 Claims, 11 Drawing Sheets

(56) References Cited

U.S. PATENT DOCUMENTS

| | | |
|---|---|---|
| 3,655,226 A | 4/1972 | Cowan |
| 3,817,560 A | 6/1974 | Guertin |
| 3,982,670 A | 9/1976 | Brass |
| 4,175,405 A | 11/1979 | Smith et al. |
| 4,402,626 A | 9/1983 | Recker |
| 4,473,016 A | 9/1984 | Gust |
| 4,500,017 A | 2/1985 | Machnee |
| 4,508,243 A | 4/1985 | Deutsch et al. |
| 4,601,372 A | 7/1986 | Swales et al. |
| 4,615,626 A | 10/1986 | Iwaki |
| 4,664,290 A | 5/1987 | Martin et al. |
| 4,948,017 A | 8/1990 | Heep et al. |
| 5,178,333 A | 1/1993 | Barber et al. |
| 5,522,669 A | 6/1996 | Recker |
| 5,632,212 A | 5/1997 | Barry |
| 5,634,737 A | 6/1997 | Voss et al. |
| 5,845,818 A | 12/1998 | Gregor et al. |
| 5,878,679 A | 3/1999 | Gregor et al. |
| 5,924,370 A | 7/1999 | Gregor et al. |
| 6,062,575 A | 5/2000 | Mickel et al. |
| 6,138,591 A | 10/2000 | Horsch |
| 6,240,861 B1 | 6/2001 | Memory |
| 6,644,225 B2 | 11/2003 | Keaton |
| 7,104,339 B2 | 9/2006 | Garner |
| 7,765,943 B2 | 8/2010 | Landphair et al. |
| 2009/0035055 A1 | 2/2009 | Rosch et al. |
| 2009/0062020 A1 | 3/2009 | Edwards et al. |
| 2010/0247233 A1 | 9/2010 | Frank et al. |
| 2012/0174842 A1 | 7/2012 | Friggstad |
| 2012/0174844 A1 | 7/2012 | Friggstad |
| 2012/0211508 A1 | 8/2012 | Barsi et al. |
| 2012/0266795 A1 | 10/2012 | Silbernagel et al. |
| 2012/0325131 A1 | 12/2012 | Thompson et al. |
| 2015/0216109 A1 | 8/2015 | Meyer et al. |

FOREIGN PATENT DOCUMENTS

| | | |
|---|---|---|
| EP | 1537768 A1 | 6/2005 |
| EP | 1570716 A2 | 9/2005 |
| WO | 0022912 A1 | 4/2000 |
| WO | 10040502 A1 | 4/2010 |

OTHER PUBLICATIONS

1665 Air Seeder Mount Inoculant Applicator; Valmar; 2013; Retrieved at http://www.valmar.com/S=0/products/view/65-series-implement-mount-granular-applicators.

SPLIT METER ROLLER SHAFT

CROSS-REFERENCE TO RELATED APPLICATION

This application is a divisional application and claims priority from and the benefit of U.S. application Ser. No. 14/932,544, entitled "SPLIT METER ROLLER SHAFT", filed Nov. 4, 2015, which claims priority from and the benefit of U.S. Provisional Application Ser. No. 62/075,083, entitled "SPLIT METER ROLLER SHAFT", filed Nov. 4, 2014, both of which are hereby incorporated by reference in their entirety.

BACKGROUND

The invention relates generally to agricultural metering on air carts, and, more specifically, to a modular metering system for a meter box.

A range of agricultural implements have been developed and are presently in use for tilling, planting, harvesting, and so forth. Seeders, for example, are commonly towed behind tractors and may cover wide swaths of ground which may be tilled or untilled. Such devices typically open the soil, dispense seeds in the soil opening, and re-close the soil in a single operation. In seeders, seeds are commonly dispensed from bulk seed tanks and distributed to row units by a distribution system. In certain configurations, air carts are towed behind the seeders to deliver a desired flow of seeds to the row units.

Air carts generally include a seed storage tank, an air source (e.g., a blower) and a metering system. The seeds are typically gravity fed from the storage tank to the metering system that distributes a desired volume of seeds into an air flow generated by the air source. The air flow then carries the seeds to the row units via conduits extending between the air cart and the seeder. The metering system typically includes meter rollers or other metering devices that regulate the flow of seeds based on meter roller geometry and rotation rate. Typically, meter rollers employ a series of flutes and recesses to control the flow of seeds. For a variety of reasons, an operator may desire to remove and/or insert meter rollers in the metering system. For instance, an operator may desire to install one meter roller with a first geometry for one seed type, and install a different meter roller with a different geometry for a different seed type.

However, meter rollers are frequently difficult to remove, insert, or replace. Moreover, a drive system may be coupled to the meter roller making it more difficult to remove and reinstall a meter roller. The difficulty removing, inserting, and/or replacing meter rollers can increase the duration of plating operations.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, an agricultural metering system includes a drive shaft configured to couple to a drive unit and to mount within a meter box of the agricultural metering system, a driven shaft configured to non-rotatably couple to the drive shaft and to decouple from the drive shaft, and a meter roller non-rotatably coupled to the driven shaft, wherein the meter roller is configured to be selectively disposed within the meter box, and the driven shaft is configured to non-rotatably engage the drive shaft while the meter roller is disposed within the meter box to facilitate rotation of the meter roller in response to rotation of the drive shaft.

In a second embodiment, an agricultural metering system includes a driven shaft having a first engagement feature configured to selectively engage a second engagement feature of a drive shaft mounted within a meter box of the agricultural metering system to non-rotatably couple the driven shaft to the drive shaft, and a meter roller non-rotatably coupled to the driven shaft, wherein the meter roller is configured to be selectively disposed within the meter box, and the first engagement feature is configured to engage the second engagement feature while the meter roller is disposed within the meter box to facilitate rotation of the meter roller in response to rotation of the drive shaft.

In a third embodiment, an agricultural metering system includes a meter box, a drive shaft mounted to the meter box and configured to couple to a drive unit, and a cartridge including a housing, a meter roller, and a driven shaft, wherein the housing is configured to rotatably support the meter roller, the housing is configured to selectively engage the meter box and to support the meter roller within the meter box, the driven shaft is configured to non-rotatably couple to the drive shaft, and the meter roller is non-rotatably coupled to the driven shaft.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
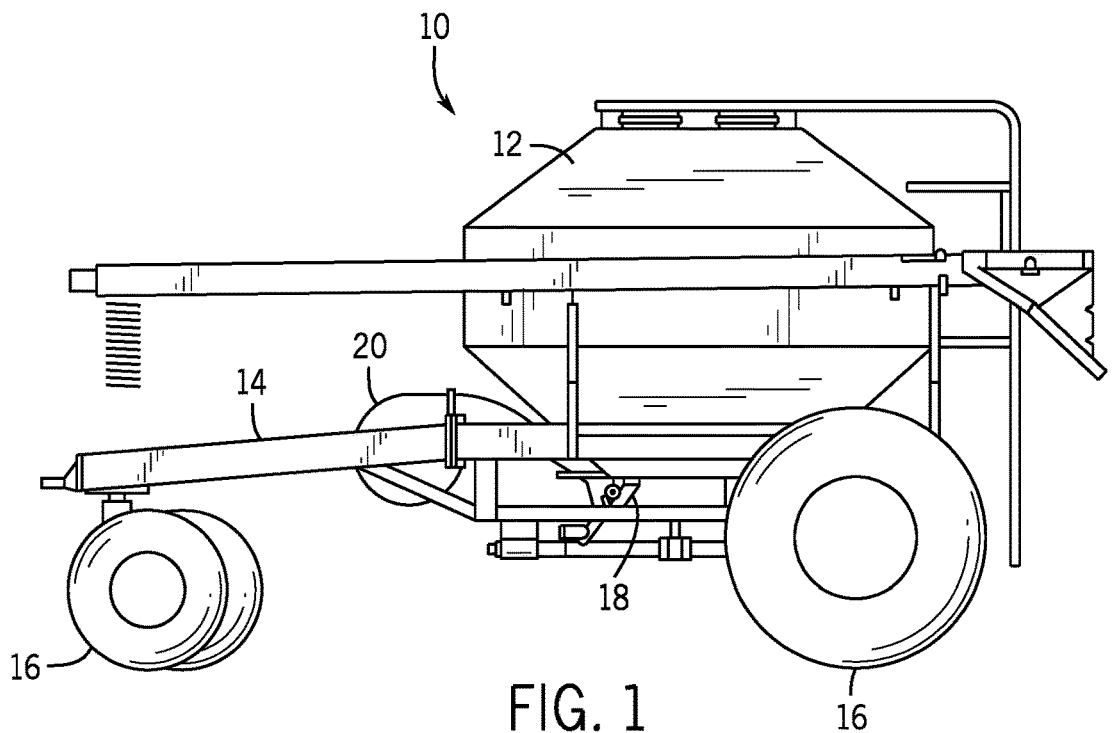
FIG. 1 is a side view of an embodiment of an air cart, including a metering assembly configured to regulate a flow of particulate material.

Turning now to the drawings, FIG. 1 is a side view of an air cart 10 that may be used in conjunction with a towable agricultural implement to deposit seeds into soil. For example, certain agricultural implements include row units configured to open the soil, dispense seeds into the soil opening, and re-close the soil. Such implements are generally coupled to a tow vehicle, such as a tractor, and pulled through a field. In certain configurations, seeds are conveyed to the row units by the illustrated air cart 10, which is generally towed in sequence with the implement (e.g., behind the implement or in front of the implement). In certain configurations, the air cart 10 may be configured to provide fertilizer to the row units, or a combination of seeds and fertilizer.

In the illustrated embodiment, the air cart 10 includes a storage tank 12, a frame 14, wheels 16, a metering system 18, and an air source 20. In certain configurations, the storage tank 12 includes multiple compartments for storing various flowable particulate materials. For example, one compartment may include seeds, such as canola or mustard, and another compartment may include a dry fertilizer. In such configurations, the air cart 10 is configured to deliver both the seeds and fertilizer to the implement. The frame 14 includes a towing hitch configured to couple to the implement or tow vehicle. As discussed in detail below, seeds and/or fertilizer within the storage tank 12 are gravity fed into the metering assembly 18. The metering assembly 18 includes meter rollers that regulate the flow of material from the storage tank 12 into an air flow provided by the air source 20. The air flow then carries the material to the implement by pneumatic conduits. In this manner, the row units receive a supply of seeds and/or fertilizer for deposition within the soil.

Figure 2:
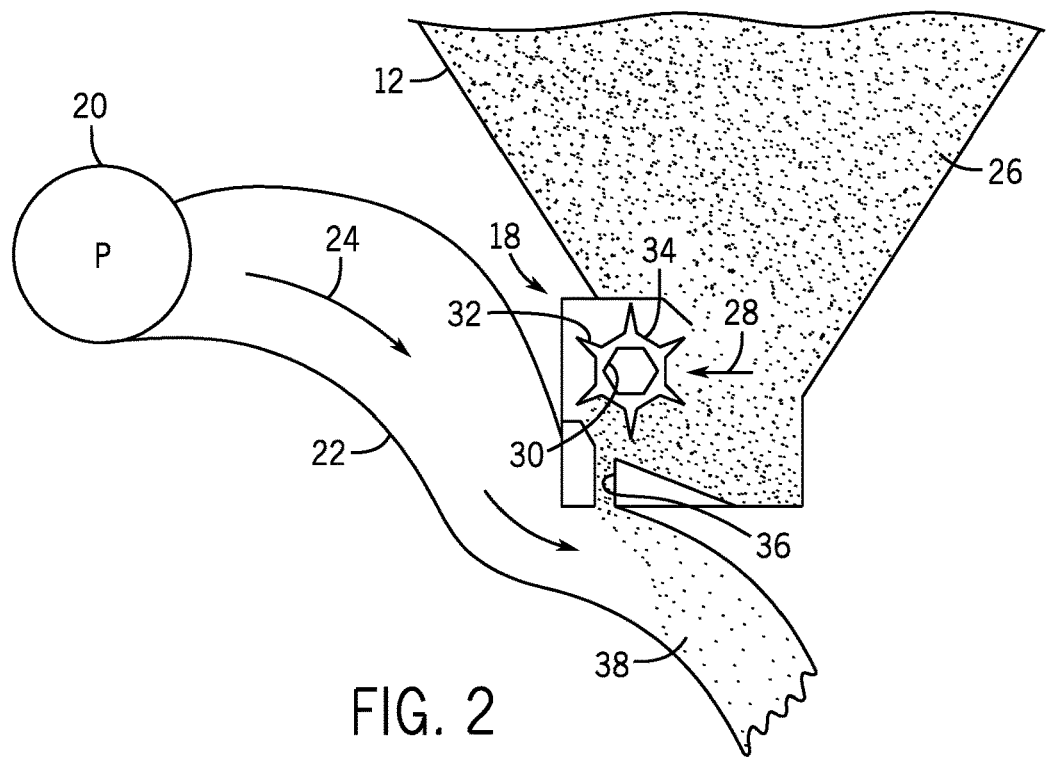
FIG. 2 is a schematic view of the metering assembly, as shown in FIG. 1, including a meter roller.

FIG. 2 is a schematic view of the metering assembly 18, as shown in FIG. 1. As illustrated, the air source 20 is coupled to a conduit 22 configured to flow air 24 past the metering system 18. The air source 20 may be a pump or blower powered by an electric or hydraulic motor, for example. Flowable particulate material 26 (e.g., seeds, fertilizer, etc.) within the storage tank 12 flows by gravity into the metering system 18. The metering system 18 includes one or more meter rollers 28 configured to regulate the flow of material 26 into the air flow 24. More particularly, the metering system 18 may include multiple meter rollers 28 (e.g., housed in individual meter boxes) disposed adjacent to one another along a longitudinal axis of the rollers 28. For example, certain metering assemblies 18 include nine meter rollers 28, each housed in an individual meter box and each configured to provide product to a respective conduit 22. In such a configuration, each conduit is configured to provide product to a respective row unit or group of row units on the implement. By independently adjusting rotation of each meter roller, product flow to different portions of the implement may be particularly controlled. However, alternative embodiments may include more or fewer meter rollers 28, e.g., 5, 6, 7, 8, 9, or more. Further embodiments may include one continuous meter roller 28.

Each meter roller 28 includes an interior cavity 30 configured to receive a shaft that drives the meter roller 28. In the present embodiment, the cavity 30 has a hexagonal cross section. However, alternative embodiments may include various other cavity configurations (e.g., triangular, square, keyed, splined, etc.). The shaft is coupled to a drive system configured to rotate the meter rollers 28. Alternatively, the meter rollers 28 may be coupled to a wheel 16 by a gear assembly such that rotation of the wheel 16 drives the meter rollers 28 to rotate. Such a configuration will automatically vary the rotation rate of the meter rollers 28 based on the speed of the air cart 10.

Each meter roller 28 also includes multiple flutes 32 and recesses 34. The number and geometry of the flutes 32 are particularly configured to accommodate the material 26 being distributed. The illustrated embodiment includes six flutes 32 and a corresponding number of recesses 34. Alternative embodiments may include more or fewer flutes 32 and/or recesses 34. For example, the meter roller 28 may include 2, 4, 6, 8, 10, 12, 14, 16, 18, 20, or more flutes 32 and/or recesses 34. In addition, the depth of the recesses 34 and/or the height of the flutes 32 are configured to accommodate the material 26 within the storage tank 12. For example, a meter roller 28 having deeper recesses 34 and fewer flutes 32 may be employed for larger seeds, while a meter roller 28 having shallower recesses 34 and more flutes 32 may be employed for smaller seeds.

For a particular meter roller configuration, the rotation rate of the meter roller 28 controls the flow of material 26 into the air stream 24. Specifically, as the meter roller 28 rotates, material is transferred through an opening 36 in the metering assembly 18 into the conduit 22. The material then mixes with air from the air source 20, thereby forming an air/material mixture 38. The mixture then flows to the row unit of the implement via pneumatic conduit, where the seeds and/or fertilizer are deposited within the soil.

As discussed above, it may be desirable to insert, remove, repair, and/or replace the meter roller 28 in the meter box 40 (e.g., change to a meter roller 28 with deeper recesses 34 and fewer flutes 32 for larger seeds). However, because the drive system may be fixed (e.g., with fasteners, molded into, etc.) to the metering system 18, it may be desirable to remove and replace the meter roller 28 without removing portions of the drive unit.

Figure 3:
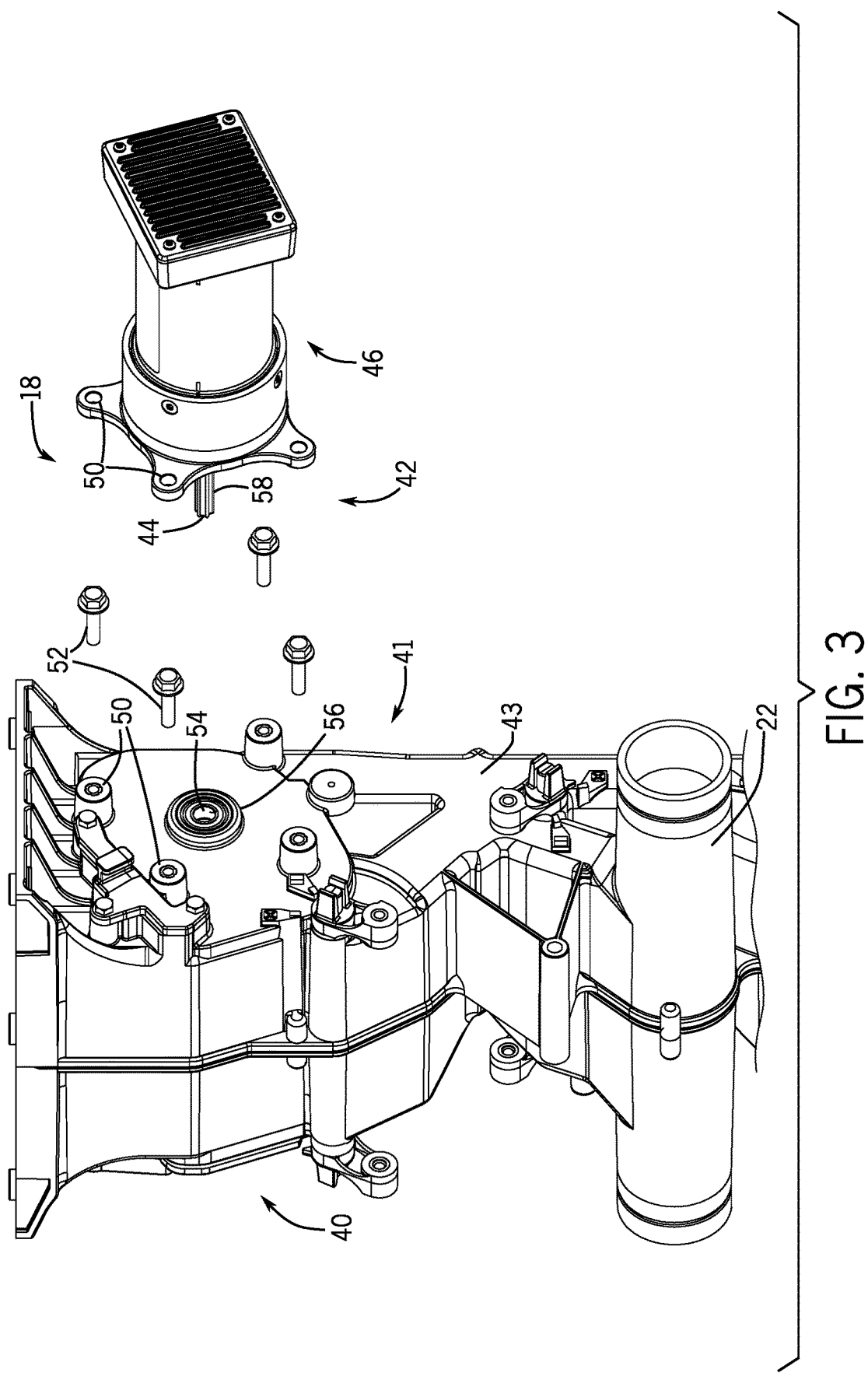
FIG. 3 is an exploded perspective view of an embodiment of an agricultural metering system.

FIG. 3 is an exploded perspective view of an embodiment of an agricultural metering system 18. The metering system 18 includes a meter box 40 and a drive system 42. The meter box 40 includes a passage 43 configured to provide product to a conduit 22 for transfer to a row unit. As shown in FIG. 3, the meter box 40 includes a first side 41 (e.g., drive side) for receiving the drive system 42. The drive system 42 includes a drive shaft 44 and a drive unit 46. The drive unit 46 may include an electric motor drives the drive shaft to rotate in a clockwise or counter-clockwise direction. The drive unit 46 and the meter box 40 include apertures 50 configured to receive fasteners (e.g., bolts) 52 to secure the drive unit 46 to the meter box 40. The drive shaft 44 is inserted into an opening 54 in the meter box such that the shaft 44 engages the meter roller 28 within the meter box 40. The drive shaft 44 is configured to drive the meter roller 28 to rotate. A bearing (e.g., ball bearing) 56 facilitates rotation of the drive shaft 44, and hence meter roller 28, within the meter box 40. As the conduit 22 transfers air under the passage 43, the drive unit 46 rotates the drive shaft 44 to rotate the meter roller 28. As the meter roller 28 rotates, the meter roller 28 dispenses material 26 to form the air/material mixture 38 as the material enters the air stream. Further, air may come from the tank 26 and through passage 43 with the product/seeds coming from the meter roller. The drive shaft 44 includes a first engagement feature 58, such as a protrusion, configured to non-rotatably couple the drive shaft 44 to the meter roller 28. The protrusion may engage a corresponding recess of the meter roller 28 discussed below.

Figure 4:
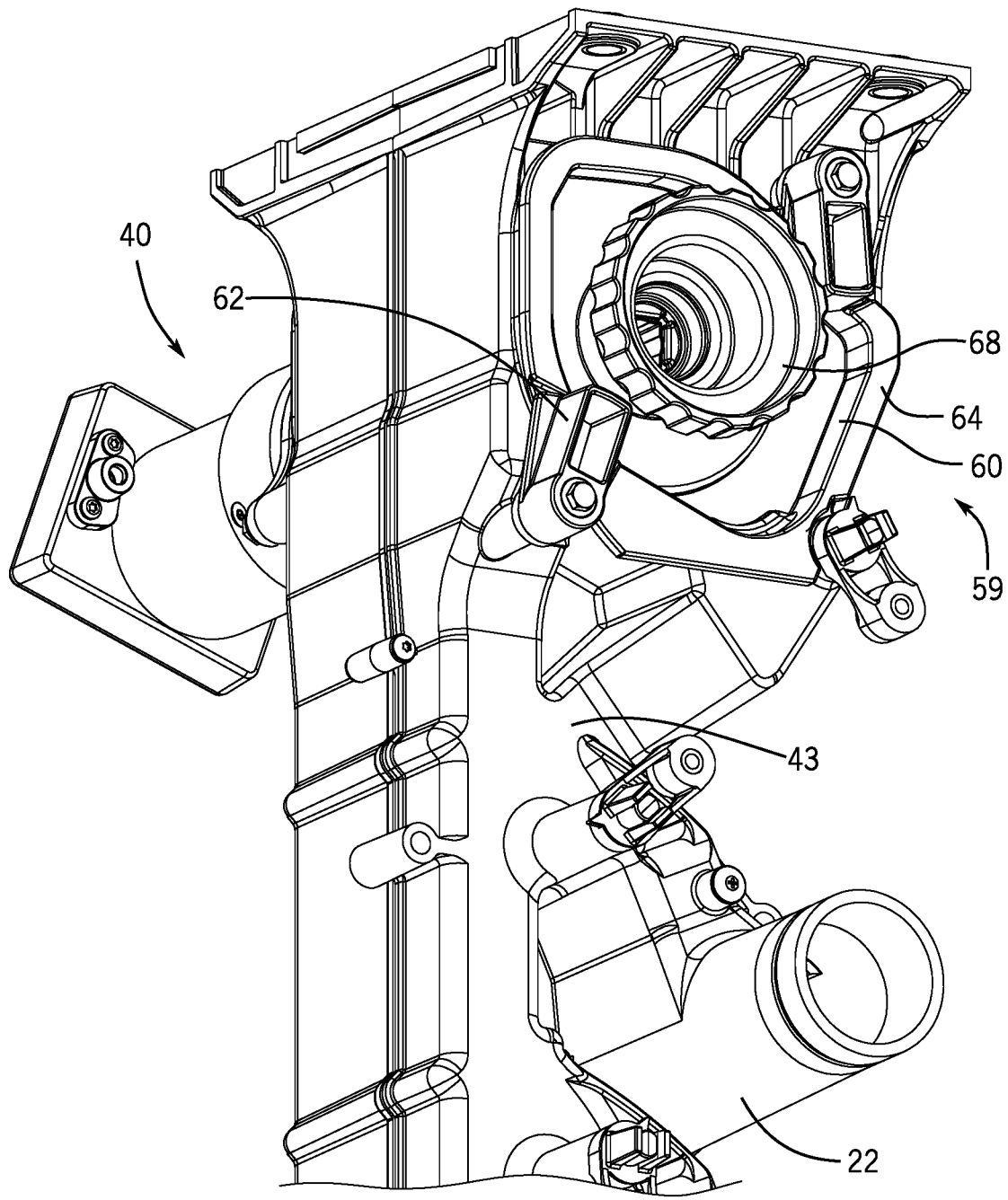
FIG. 4 is a perspective view of a meter box of the agricultural metering system of FIG. 3.

In an embodiment, the metering system 18 may use a modular meter roller cartridge to facilitate removal and installation of the meter roller 28. FIG. 4 is a perspective view of a second side 59 (e.g., bearing side) of the meter box 40 of the agricultural metering system 18. As illustrated, the meter box 40 houses a modular meter roller cartridge 60.

While the cartridge 60 is housed within the meter box 40 of the metering system 18 of the present embodiment, alternative embodiments of the meter box may house a meter roller 28 without a cartridge or house multiple cartridges (e.g., 2-10). In the present embodiment, the metering system 18 is configured to enable the cartridge 60 to engage the meter box 40 via an opening in the meter box. This configuration facilitates operation of the meter roller 28 while the cartridge 60 is engaged. The cartridge 60 has a cross-sectional shape that substantially corresponds to the cross-sectional shape of the opening of the meter box. In the present embodiment, a cartridge locking tab 62 (e.g., latch) may block passage of the cartridge 60 out of the meter box 40, thereby retaining the cartridge 60 in the meter box 40. While the meter box 40 of the system 18 includes a rotatable latch, the cartridge locking tab 62 may be a spring latch, bolt latch, or any suitable type of locking mechanism known in the art. The cartridge locking tab 62 may include a recess that engages a corresponding notch on the cartridge 60 to further secure the cartridge from disengaging from vibrations or hard movement. The meter box 40 may include a gate 64 (e.g., lid) to further secure/remove the cartridge 60 and/or the meter roller 28. The cartridge 60 may be removed by rotating the latch in a first direction and extracting the cartridge 60. Further, the cartridge 60 may be inserted by engaging the cartridge with the meter box 40 and rotating the latch in a second direction, opposite the first direction. The cartridge 60 includes a releasable bearing coupler 68. As further described below, the releasable bearing coupler 68 facilitates rotation of the meter roller 28 within the cartridge and facilitates removal of the meter roller from the cartridge.

Figure 5:
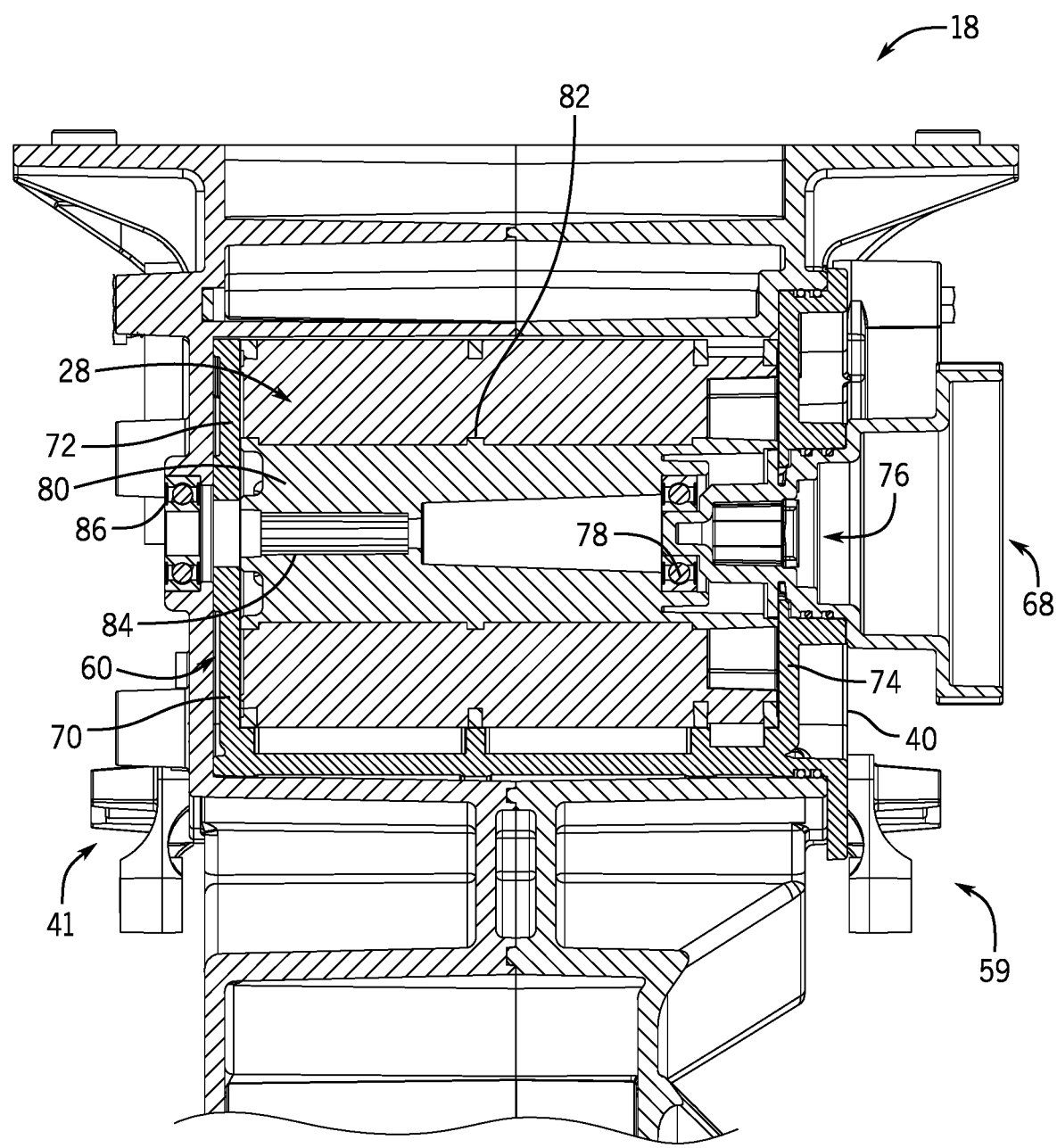
FIG. 5 is a cross-sectional view of the agricultural metering system of FIG. 3.

FIG. 5 is a cross-sectional view of the metering system 18, as shown in FIG. 4. As illustrated, the cartridge 60 is coupled to the meter box 40 of the metering system 18. The cartridge 60 includes a housing 70 configured to rotatably support the meter roller 28 within the meter box 40 (e.g., the housing 70 is secured to the meter box while the meter roller 28 rotates). The housing 70 includes a first side 72 (e.g., cartridge drive side) and a second side 74 (e.g., cartridge bearing side) which correspond to the first side 41 and second side 59 of the meter box 40.

The cartridge 60 includes a bearing opening 76 for receiving a bearing 78, which engages the meter roller 28 with the releasable bearing coupler 68. The meter roller 28 is non-rotatably coupled to (e.g., integrally formed with) a driven shaft 80. In the illustrated embodiment, the driven shaft 80 includes a protrusion 82 that engages a corresponding recess of the meter roller 28. In certain embodiments, the meter roller 28 and the driven shaft 80 may be, for instance, formed from one piece of molded plastic.

The driven shaft 80 is configured to non-rotatably couple to the drive shaft 44. The driven shaft 80 includes a second engagement feature 84 (e.g., a recess) for selectively engaging with the first engagement feature 58 (e.g., protrusion) of the drive shaft 44. The second engagement feature 84 may have a polygonal cavity to engage a matching polygonal shape of the first engagement feature 58. While the engagement feature 84 shown in FIG. 4 reflects shape-based engagement, any variety of suitable interlocking mechanisms may be used for rotating the driven shaft 80 with the drive shaft 44 as the motor of the drive unit 46 is operating. Furthermore, a drive bearing 86 is used to facilitate rotation of the drive shaft 44 within the meter box. As shown in FIGS. 3 and 5, the drive bearing 86, the driven shaft 80, the drive shaft 44, and the bearing 78 associated with the releasable bearing coupler 68 are in longitudinal alignment, thereby facilitating rotation of the meter roller 28 in response to rotation of the drive shaft 44. The bearing 78 may be coupled to the releasable bearing coupler 68, the driven shaft 80, or it may be a separate individual piece. When the cartridge 60 is coupled to the meter box 40, it rotatably supports the meter roller 28. Once an operator desires to change the meter roller 28, the operator removes the cartridge 60, thereby enabling another cartridge to be inserted.

Figure 6:
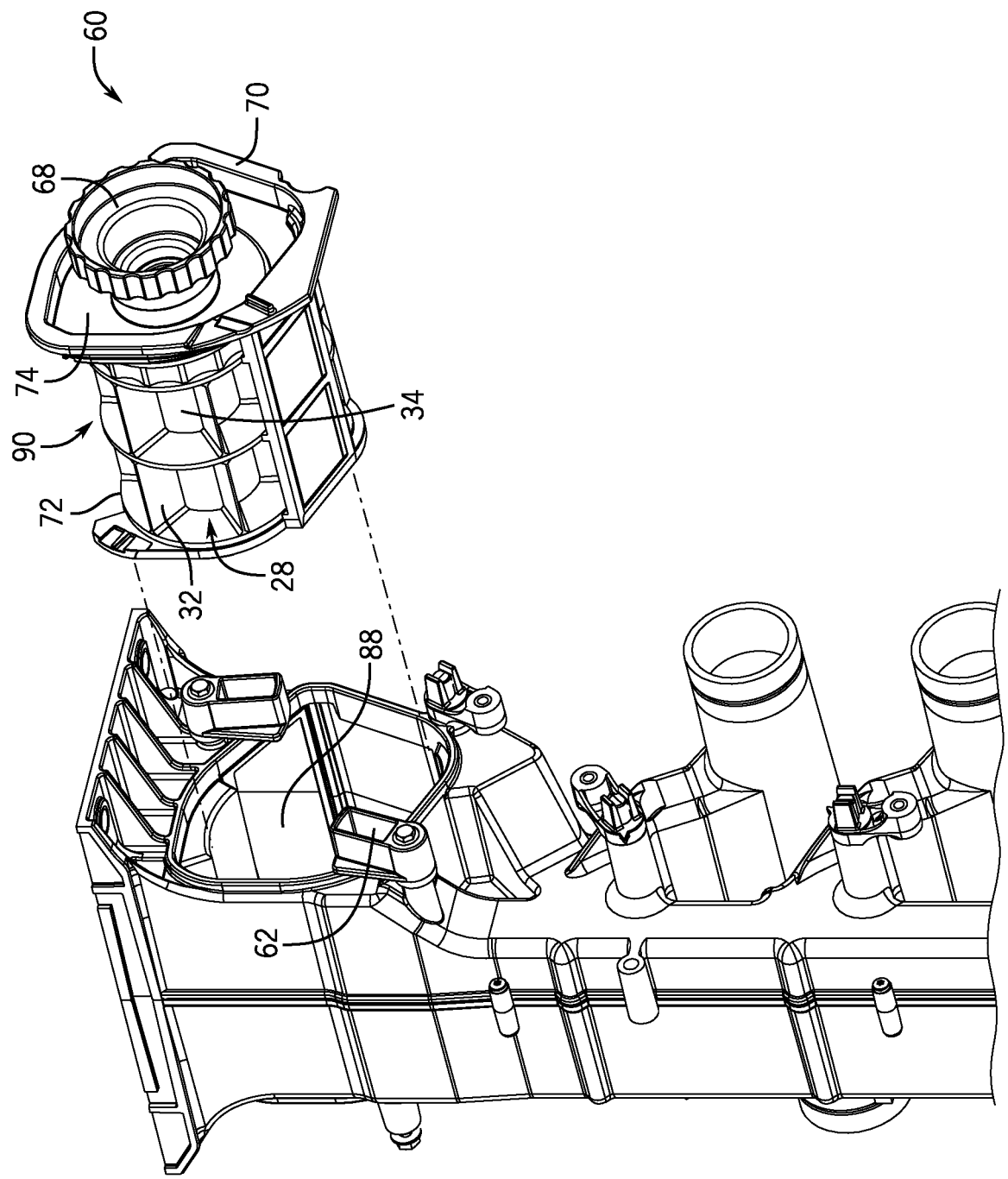
FIG. 6 is a perspective view of the meter box of FIG. 4, with a meter roller cartridge removed from a housing of the meter box.

FIG. 6 is a perspective view of the meter box 40 with the cartridge 60 removed from the meter box 40 and the slide assembly omitted. The present disclosure applies whether a meter box 40 includes a slide assembly, as in FIG. 3 or 4, or it does not include a slide assembly. For removal of the cartridge 60, the operator may unlock the cartridge locking tab 62 (e.g., via rotation of the tab) and pull the cartridge 60 out of the meter box 40. As shown in FIG. 6, the cross-sectional shape of the cartridge 60 (e.g., the first side 72, the second side 74, and/or other portions of the cartridge) substantially correspond to the shape of the meter box opening 88. The cartridge 60 includes the releasable bearing coupler 68 and the meter roller 28. In another embodiment, the bearing coupler 68 enters through a meter box bearing coupler opening to interlock the cartridge 60, the releasable bearing coupler 68, and the meter box 40.

The meter roller 28 includes flutes 32 and recesses 34 which can be seen through a meter roller opening 90. The meter roller opening 90 of the cartridge 60 enables material 26 to flow from the storage tank 12 to the meter roller 28. The meter roller 28 is supported longitudinally on second side 74 of the meter roller cartridge 60 by the releasable bearing coupler. Once the cartridge 60 is removed, the releasable bearing coupler 68 may be disconnected and removed. This may enable an operator remove the meter roller through the opening and to insert a different meter roller 28.

Figure 7:
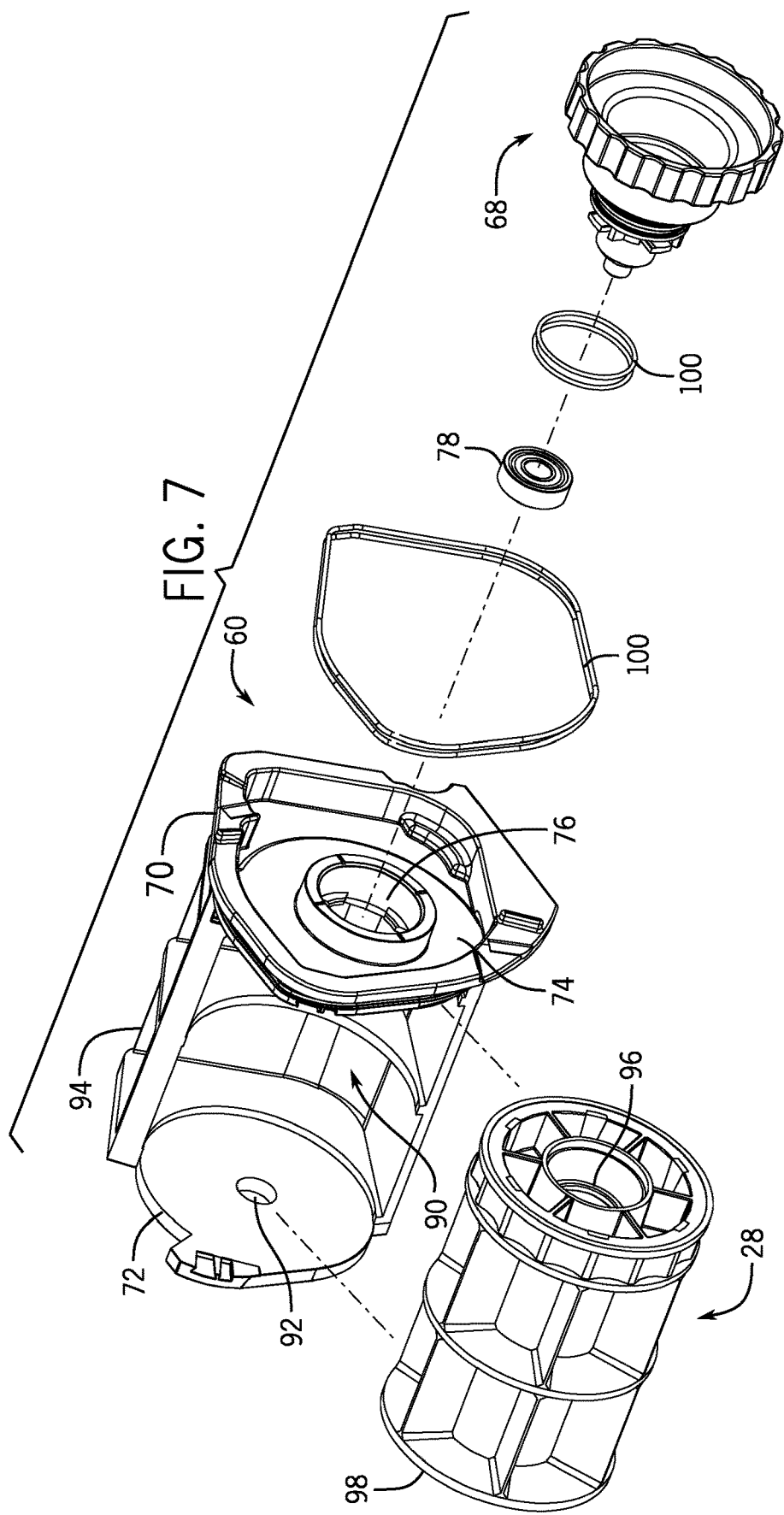
FIG. 7 is an exploded perspective view of the meter roller cartridge of FIG. 6, including a meter roller and a releasable bearing coupler.

FIG. 7 is an exploded perspective view of the meter roller cartridge 60. The housing 70 of the modular meter roller cartridge 60 includes a drive shaft opening 92 on the first side 72 of the housing 70, the bearing opening 76 on the second side 74 of the housing 70, the meter roller opening 90, and seed openings 94 for receiving and/or dispensing seeds. The first side 72 and the second side 74 may be approximately parallel to facilitate alignment of the drive shaft 44 and releasable bearing coupler 68.

In order to couple the meter roller 28 to the cartridge 60, the meter roller 28 may first be disposed in the housing 70 through the meter roller opening 90. When the meter roller 28 is inserted, the drive shaft opening 92 on the first side 72 of the housing 70 aligns with a drive shaft opening 98 (e.g., a recess or interior cavity) of the driven shaft. Similarly, the bearing opening 76 on the second side 74 of the housing aligns with a bearing opening 96 (e.g., a recess or interior cavity) of the meter roller 28. The bearing opening 96 may receive the bearing 78 or the bearing may be fixedly mounted within the opening 96. The openings of the meter roller 28, the driven shaft, and cartridge 60 may also longitudinally align with the driven shaft 80.

The meter roller cartridge 60 and/or the releasable bearing coupler 68 may include gaskets 100. While two gaskets 100 are shown in FIG. 7, any suitable number of gaskets may be used to seal adjacent parts.

Once the meter roller 28 is disposed in the housing 70, the bearing opening 96 may receive the bearing 78 and/or the releasable bearing coupler 68 which may include the bearing in certain embodiments. The bearing 78 may be fixedly coupled to the meter roller 28 or fixedly coupled to the releasable bearing coupler 68 in certain embodiments. In further embodiments, the bearing 78 may be an independent piece. Similarly, the releasable bearing coupler 68 may include the bearing 78 or simply be configured to engage the bearing 78 with a shaft of the coupler. Accordingly, the bearing 78 may be configured to engage the opening 96 of the meter roller 28 to facilitate rotation relative to the housing 70 (e.g., rotation about the shaft of the releasable bearing coupler).

Figure 8:
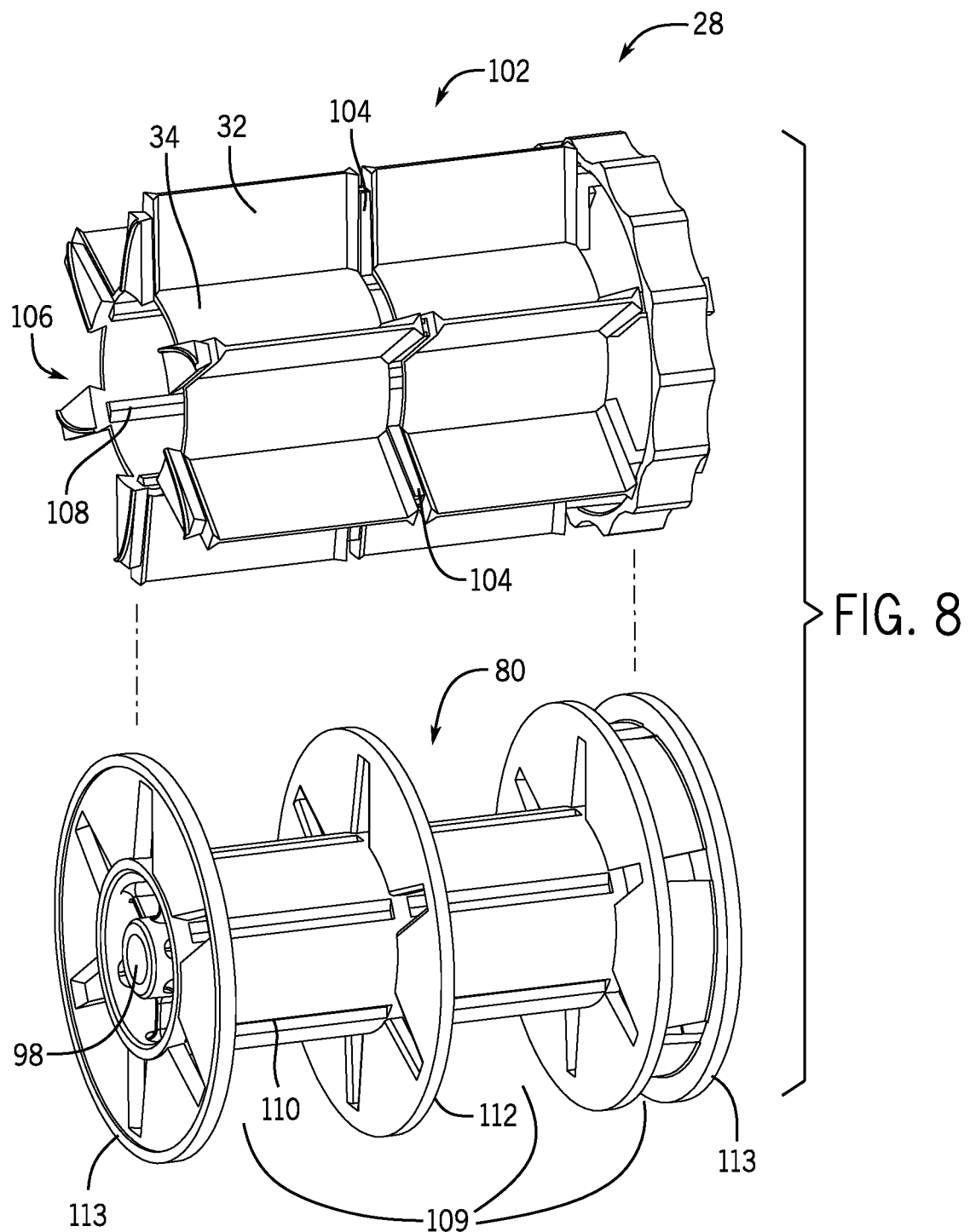
FIG. 8 is an exploded perspective view of the meter roller of FIG. 7.

FIG. 8 is an exploded perspective view of the meter roller 28, as shown in FIG. 7. The meter roller 28 includes the driven shaft 80 and a fluted portion 102. The fluted portion 102 of the meter roller 28 includes flutes 32, recesses 34, and/or interlocking segments 104. The fluted portion 102 includes a cavity 106 for receiving and coupling to the driven shaft 80. The fluted portion 102 may non-rotatably couple to the driven shaft 80 via engagement of grooves 108 of the fluted portion 102 with chamfers 110 of the driven shaft 80. As shown in FIG. 8, the driven shaft 80 is separated by a ring 112. The ring may interlock with the ring segment 104 to segment the meter roller. The roller segments 109 may be used to selectively choose which roller segment 109 is metering. For instance, seeds may only be deposited in one, two, or all three roller segments depending on where seeds are limited to enter. As such, there is segmentation of the roller so that the meter roller can accommodate a wide range of products and application rates. While the meter roller 28 in FIG. 8 has one ring 112, the meter roller may include no ring or multiple rings in alternative embodiments. The ring 112 and driven shaft 80 may be formed from one piece of molded plastic. The fluted portion 102 may be an overmold that is molded over the driven shaft 80. The fluted portion 102 may be mechanically bonded and/or chemically bonded to the driven shaft 80. The grooves 108 and chamfers 110 may non-rotatably couple the fluted portion 102 and the driven shaft 80. In an alternate embodiment of the driven shaft 80, the rings, and ends 113 may be separate parts that may be coupled to one another. Additionally, in an alternate embodiment of the fluted portion 102, the flutes, recesses, and/or ring segments may be separate parts. The driven shaft 80 also includes the drive shaft opening 98 to interlock with the drive shaft 44.

Figure 9:
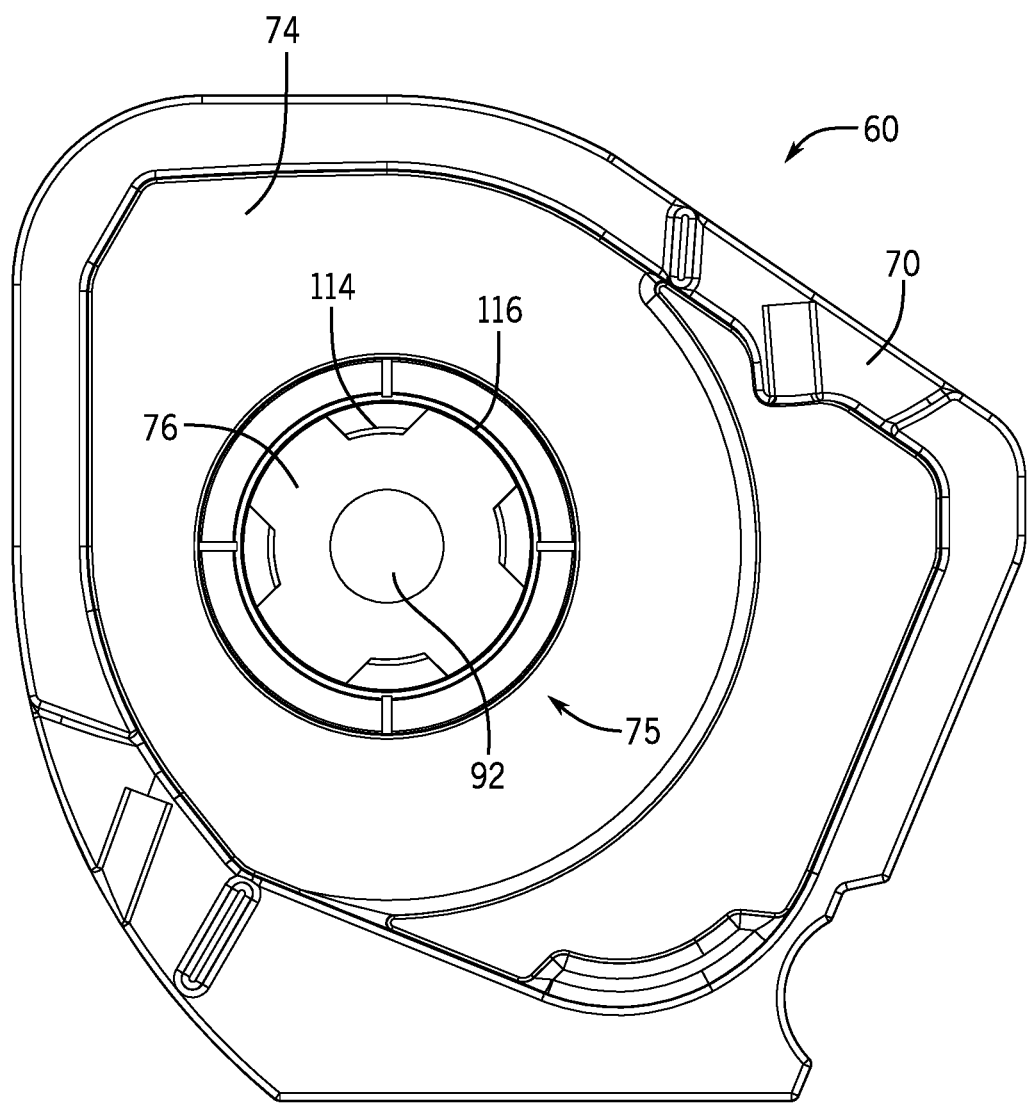
FIG. 9 is a side view of a modular meter roller cartridge of FIG. 7.

FIG. 9 is a side view of the cartridge housing 70. The second side 74 (e.g., cartridge bearing side) of the housing 70 includes the bearing opening which is configured to interlock with the releasable bearing coupler 68. As mentioned above, the shape of the first side 72 and/or the second side 74 of the housing 70 may correspond to the shape of the meter box opening. The first side 72 and second side 74 have substantially similar shape and/or have substantially aligned openings. For instance, FIG. 9 shows the bearing opening 76 aligned with the drive shaft opening 92. The aligned openings facilitate insertion of shafts into opposite sides of the meter roller thereby enabling the meter roller to rotate. The second side 74 includes a locking feature 75 configured to selectively interlock with a corresponding locking segment of the releasable bearing coupler 68 to secure the releasable bearing coupler 68 to the housing 70. The locking feature 75 includes locking notches 114 and locking recesses 116. While four locking notches 114 and locking recesses 116 are shown, any suitable number of notches and/or recesses may be used to engage the locking segment of the releasable bearing coupler 68. The notches 114 and recesses 116 have corresponding features on the releasable bearing coupler 68.

Figure 10:
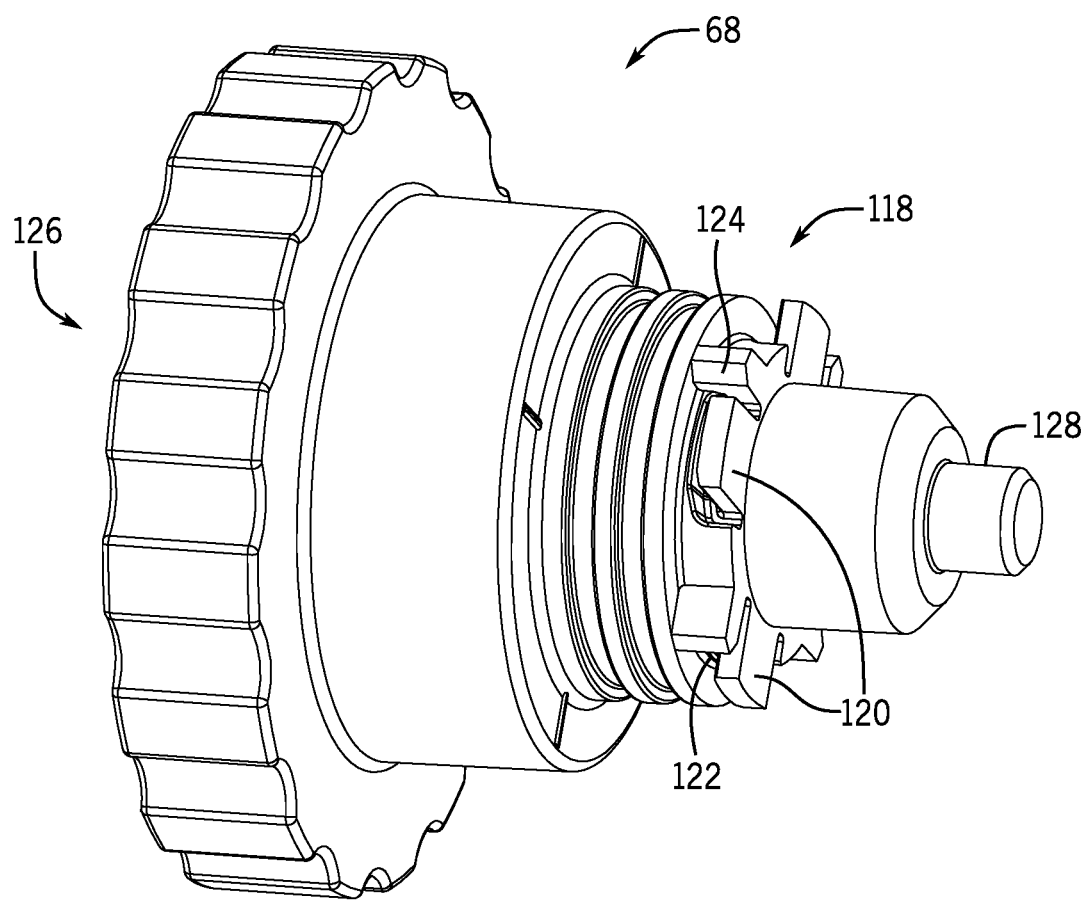
FIG. 10 is a perspective view of a releasable bearing coupler of FIG. 7.

FIG. 10 is a perspective view of the releasable bearing coupler 68 configured to selectively couple the meter roller 28 to the housing 70 of the meter roller cartridge 60. The releasable bearing coupler 68 includes a locking segment 118 for selectively engaging a corresponding locking feature 75 of the housing 70. The locking segment includes interlocking notches 120 and interlocking recesses 122 for securing the releasable bearing coupler 68 to the housing 70. For instance, an operator may insert the interlocking notches 120 through the recesses 116 of the housing 70. Then, the operator may rotate the releasable bearing coupler 68 to engage the locking notches 114 of the housing 70 into the interlocking recesses 122 of the coupler 68. After an eight of a turn, the interlocking notches rotate with respect to the interlocking recesses and limiting notches 124 block further rotation of the coupler 68.

The releasable bearing coupler 68 also includes a grip segment 126 and a shaft 128. The grip segment 126 has edges to help an operator rotate the releasable bearing coupler 68. The grip segment 126 is configured to remain on an exterior of the housing 70 of the cartridge 60 when the locking segment 118 of the releasable bearing coupler 68 engages the locking feature 75 of the housing 70. The shaft 128 is configured to be disposed through the cartridge opening 76 and/or the meter roller opening 96 to engage the bearing 78. Thus, the grip segment 126 remains easy for an operator to grip to disengage the coupler 68, and the shaft 128 is secured inside the cartridge to engage the bearing 78.

Figure 11:
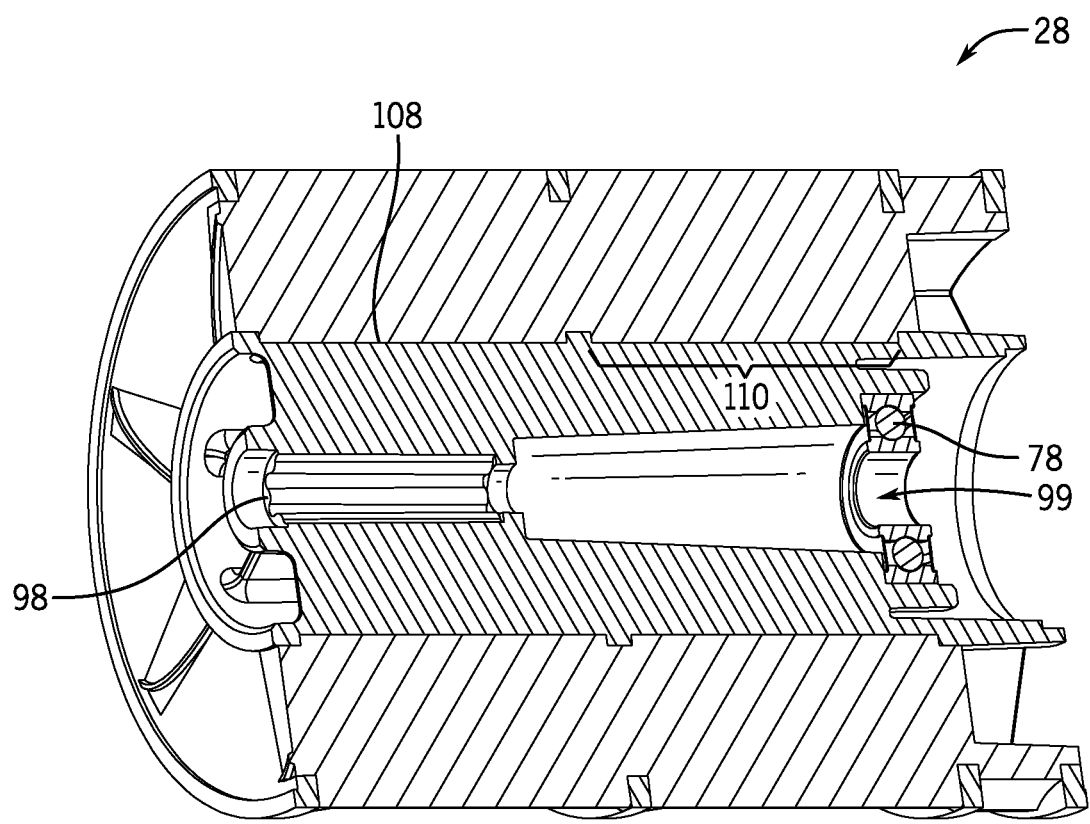
FIG. 11 is a cross-sectional perspective view of the meter roller of FIG. 7.

FIG. 11 is a perspective cross-sectional view of the meter roller. The meter roller 28 has the driven shaft opening 98. As shown in FIG. 11, the bearing 78 is disposed within the recess 99 of the meter roller. The shaft 128 of the coupler 68 engages the bearing 78 within the meter roller 28. Additionally, the grooves 108 and chamfers 110 are interlocked to mechanically lock the fluted portion 102 to the driven shaft 80.

Figure 12:
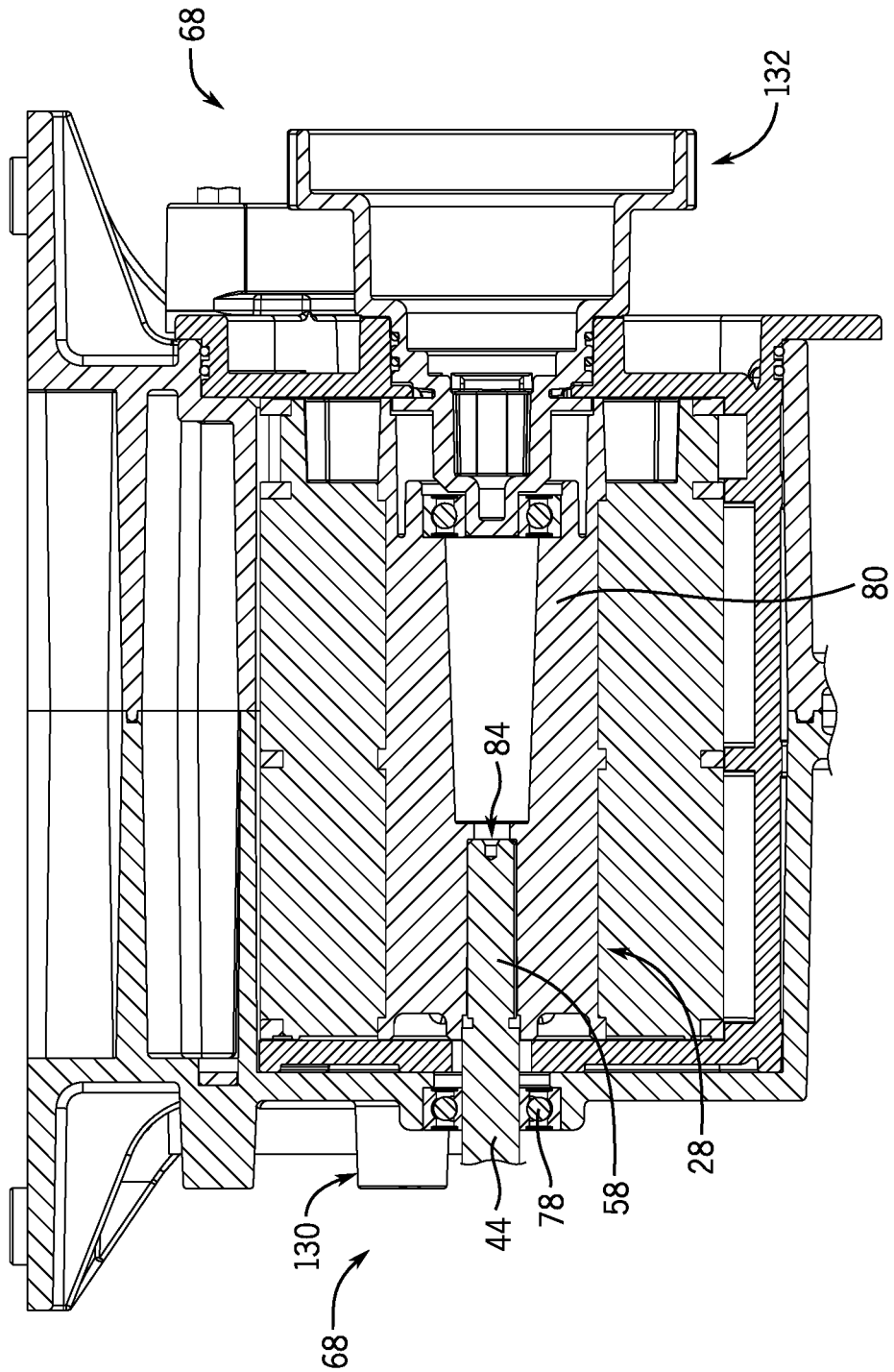
FIG. 12 shows a cross-sectional side view of another embodiment of a meter box.

While the embodiments described above include a meter roller cartridge 60, in some cases, it may be desirable to use a system 18 without a meter roller cartridge 60. FIG. 12 is a cross-sectional view of another embodiment of the system 18 that does not include a meter roller cartridge 60. Similar to the embodiments disclosed above, the system 18 includes a split shaft (e.g., the drive shaft 44 and the driven shaft 80). The system 18 without the cartridge 60 may include one or two releasable bearing couplers. As shown in FIG. 12, a first releasable bearing coupler 130 may engage the drive shaft 44 and the driven shaft 80 through an opening in the meter box 40. The first releasable bearing coupler 130 and/or the second releasable bearing coupler 132 may include a locking segment 118, a grip segment 126, a bearing 78 and a shaft 128 similar to the releasable bearing coupler described in FIG. 10. The bearing 78 may contact the drive shaft 44, the driven shaft 80, and/or the first releasable bearing coupler 130 or second releasable bearing coupler 132 to facilitate rotation of the meter roller. As shown in FIG. 12, for instance, the bearing 78 contacts the drive shaft 44 to facilitate rotation with respect to the first releasable bearing coupler 130. Further, the first releasable bearing coupler 130 may include an aperture for engaging the drive shaft 44 with the driven shaft 80. The meter roller 28 may be enclosed in the gate 64 as shown on the meter box 40 in FIG. 4. The gate 64 may secure the meter roller 28 in the meter box 40. As shown in FIG. 12, the two releasable bearing couplers 130 hold the driven shaft 80 within the meter box 40. To install the meter roller 28, the operator opens the gate 64 and inserts the meter roller 28 into the meter box 40 and engages the first engagement feature 58 with the second engagement feature 84. Then the operator secures the two releasable bearing couplers 68 to rotatably couple the driven shaft 80 to the meter box 40. The operator may then close the gate 64.

The embodiments described above facilitate engagement and disengagement of the meter roller 28 from a metering system. By utilizing a split shaft, an operator gains access to the meter roller 28 without removing drive system 42. Additionally, having a modular meter roller cartridge 60 provides support for the meter roller 28 and facilitates removal and installation of the desired components (e.g., meter roller 28, driven shaft 80, releasable bearing coupler 68). With a releasable bearing coupler 68, the meter roller 28 can be quickly coupled and decoupled from the cartridge 60.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural metering system, comprising:
   a driven shaft having a first engagement feature configured to selectively engage a second engagement feature of a drive shaft mounted within a meter box of the agricultural metering system to non-rotatably couple the driven shaft to the drive shaft;
   a meter roller non-rotatably coupled to the driven shaft, wherein the meter roller is configured to be selectively disposed within the meter box, and the first engagement feature is configured to engage the second engagement feature while the meter roller is disposed within the meter box to facilitate rotation of the meter roller in response to rotation of the drive shaft,
   a meter roller cartridge, wherein the meter roller cartridge comprises a housing configured to rotatably support the meter roller and the drivers shaft; and
   a releasable bearing coupler, wherein the releasable bearing coupler couples to the driven shaft, wherein the releasable bearing coupler is configured to engage a recess of the meter roller to couple the meter roller to the housing of the meter roller cartridge and to facilitate rotation of the meter roller relative to the housing,
   wherein a bearing of the releasable bearing coupler contacts the meter roller to facilitate rotation of the meter roller relative to the housing.

2. The agricultural metering system of claim 1, wherein the first engagement feature comprises at least one protrusion and the second engagement feature comprises at least one recess, wherein the at least one protrusion is configured to engage the at least one recess to non-rotatably couple the drive shaft to the driven shaft.

3. The agricultural metering system of claim 1, comprising a bearing on a longitudinal end of the driven shaft.

4. The agricultural metering system of claim 1, wherein the driven shaft is configured to non-rotatably couple to the drive shaft while the drive shaft is coupled to a drive unit.

* * * * *